United States Patent
Adachi et al.

(10) Patent No.: US 7,954,101 B2
(45) Date of Patent: May 31, 2011

(54) SKIPPING NON-TIME-CRITICAL TASK ACCORDING TO CONTROL TABLE WHEN OPERATING FREQUENCY FALLS

(75) Inventors: Kenichi Adachi, Tokyo (JP); Kazuaki Yazawa, Chiba (JP); Iwao Takiguchi, Kanagawa (JP); Atsuhiko Imai, Tokyo (JP); Tetsuji Tamura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1215 days.

(21) Appl. No.: 10/575,042

(22) PCT Filed: Apr. 8, 2005

(86) PCT No.: PCT/JP2005/006966
§ 371 (c)(1), (2), (4) Date: Nov. 13, 2006

(87) PCT Pub. No.: WO2005/119447
PCT Pub. Date: Dec. 15, 2005

(65) Prior Publication Data
US 2007/0074216 A1    Mar. 29, 2007

(30) Foreign Application Priority Data
Jun. 1, 2004 (JP) ................. 2004-163649

(51) Int. Cl.
*G06F 9/46* (2006.01)
*G06F 1/00* (2006.01)

(52) U.S. Cl. ........................ 718/102; 713/322

(58) Field of Classification Search ............ 718/100, 718/102; 713/322
See application file for complete search history.

(56) References Cited

U.S. PATENT DOCUMENTS

| | | | | |
|---|---|---|---|---|
| 5,394,548 A | * | 2/1995 | Nakajima et al. | 718/103 |
| 5,723,998 A | * | 3/1998 | Saito et al. | 327/513 |
| 5,794,036 A | | 8/1998 | Gomi | |
| 6,834,354 B1 | | 12/2004 | Togawa | |
| 2002/0065049 A1 | | 5/2002 | Chauvel et al. | |
| 2003/0115239 A1 | | 6/2003 | Togawa | |

FOREIGN PATENT DOCUMENTS

EP    1115051 A1    7/2001
(Continued)

OTHER PUBLICATIONS

Office action for Korean Application No. 10-2006-7011159 dated Nov. 19, 2007.
(Continued)

*Primary Examiner* — Meng-Ai An
*Assistant Examiner* — Brian Chew
(74) *Attorney, Agent, or Firm* — Matthew B. Dernier; Gibson & Dernier LLP

(57) ABSTRACT

This task management method includes dividing a unit time of processing into a reserved band for guaranteeing real-timeness and a non-reserved band not for guaranteeing real-timeness, and skipping a task to be executed in the non-reserved band as appropriate when processor throughput falls. That is, when the operating frequency of the processor is lowered in order to suppress heat generation, the real-timeness of tasks to be executed in the reserved band is guaranteed at the expense of processing the task to be executed in the non-reserved band in a best-efforts fashion.

25 Claims, 17 Drawing Sheets

FOREIGN PATENT DOCUMENTS

| | | |
|---|---|---|
| EP | 1321855 A1 | 6/2003 |
| JP | 08-054956 | 2/1996 |
| JP | 10-171668 | 6/1998 |
| JP | 10-283204 | 10/1998 |
| JP | 2003-108260 | 4/2003 |

OTHER PUBLICATIONS

Supplementary European Search Report EP05728400, Dec. 2, 2008.

Koren G. et al. : "Skip-Over: algorithms and complexity for overloaded systems that allow skips" Proceedings. 16th IEEE Real-Time Systems Symposium (CAT. No. 95CB35882) IEEE Comput. Soc. Press Los Alamitos, CA, USA, 1995.

Zhu D. et al. : "Scheduling with dynamic voltage/speed adjustment using slack reclamation in muti-processor real-time systems" Proceedings 22nd IEEE Real-Time Systems Symposium (RTSS 2001) (CAT. No. 01PR1420) IEEE Comput. Soc Los Alamitos, CA, USA, 2001.

International Preliminary Report on Patentability based on corresponding PCT/JP2005/006966, dated Dec. 14, 2006; 5 pgs.

International Search Report for PCT/JP2005/006966, dated Jul. 12, 2005.

Office Action for JP 2004-163649, dated Jun. 28, 2005.

Office Action for JP 2004-163649, dated Feb. 21, 2006.

Office action for Chinese Application No. 200580001108.1 dated Jun. 22, 2007.

* cited by examiner

FIG.6

| ATTRIBUTE (184) | TASK (186) | PRIORITY (188) |
|---|---|---|
| ⋮ | ⋮ | ⋮ |
| RT | RENDERING | 9 |
| RT | RECORD | 10 |
| NRT | BROWSER | 5 |
| ⋮ | ⋮ | ⋮ |

164

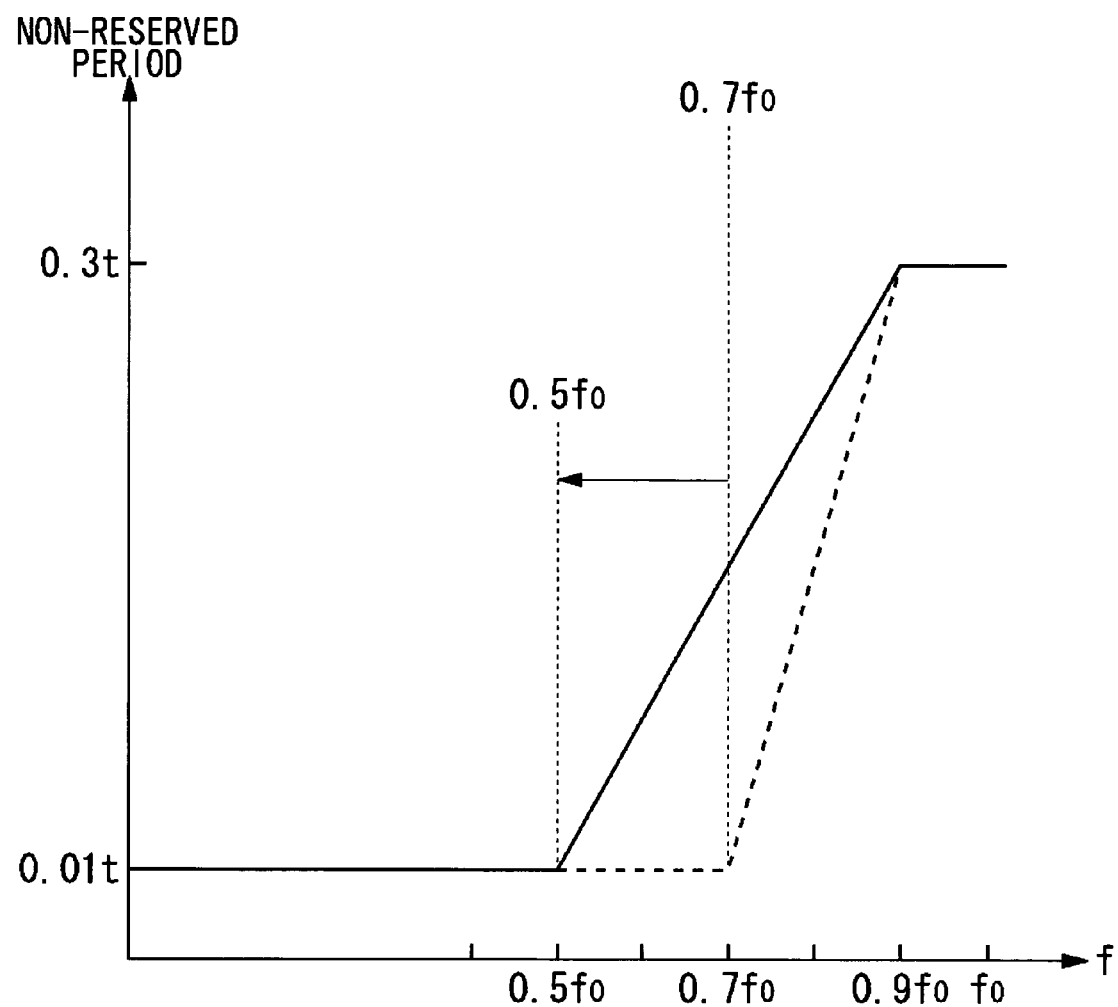

SKIPPING NON-TIME-CRITICAL TASK ACCORDING TO CONTROL TABLE WHEN OPERATING FREQUENCY FALLS

BACKGROUND OF THE INVENTION

1. Field of the Invention

The invention relates to a method for managing tasks to be executed by a processor, a device for managing tasks by using the method, a semiconductor integrated circuit as a materialization of the device, and an electronic apparatus having the semiconductor integrated circuit.

2. Description of the Related Art

With increasing trends toward finer manufacturing processes and higher device integration, it has become extremely important for LSI design to take account of the amount of, heat generation in the performance limits of a chip. At higher temperatures, chips can malfunction or drop in long-term reliability. Various measures against heat generation have thus been taken. For example, in one method, radiating fins are arranged on the top of a chip so as to release heat occurring from the chip.

It has also been contemplated to schedule processor tasks based on the distribution of power consumption on the chip. Moreover, as a method of avoiding high chip temperatures, studies have also been made to lower the operating frequency of the processor (for example, see US Patent Application Publication No. 2002/0065049).

While the operating frequency can be lowered to reduce the amount of heat generation in the chip, the reduced number of processing steps per unit time sometimes makes it impossible for tasks that must be completed within a unit time to be completed within a unit time. For this reason, programs must be designed on the basis of a minimum operating frequency in advance. This in turn makes it impossible to make full use of the processor throughput.

SUMMARY OF THE INVENTION

The present invention has been achieved in view of the foregoing problem and relates to an effective method for task management, a task management device based on the method, a semiconductor integrated circuit as a materialization of the device, and an electronic apparatus having the semiconductor integrated circuit to attain such conflicting goals.

One embodiment of the present invention relates to a method of executing tasks. This method includes dividing a unit time of processing in executing tasks by a processor into a reserved band for guaranteeing real-timeness and a non-reserved band not for guaranteeing real-timeness, and skipping a task to be executed in the non-reserved band as appropriate when the processor falls in throughput. In the strict sense, executing a task or skipping a task refers to executing or skipping a process, or program, pertaining to the task. For the sake of simplicity, however, such simple expressions as "executing a task" and "skipping a task" will be employed hereinafter. The term "task" shall refer to a single block of functions irrespective of the volume of the program. Thus, a task may sometimes refer to a functional unit greater than ones recognized by actually-prevailing OSs.

"A fall in the throughput of the processor" may result from a decrease in the operating frequency of the processor. The operating frequency of the processor may be lowered when the processor or a peripheral circuit thereof exceeds a predetermined threshold in temperature. The operating frequency may also be lowered depending on the power consumption of the processor.

According to this embodiment, tasks to be executed in the non-reserved band are skipped as appropriate when the processor falls in throughput. Consequently, the real-timeness of tasks to be executed in the reserved band is guaranteed, or at least the probability thereof is increased significantly (hereinafter, referred to simply as "guaranteed"). In other words, as long as tasks to guarantee real-timeness of are designed to fall within the reserved band, the throughput of the processor may be changed without sinking below the reserved band. This allows flexible heat control on the processor.

Another embodiment of the present invention is a task management device. This device comprises: a switch instruction unit which issues an instruction to switch a plurality of tasks to be executed by a processor; and a detection unit which detects a throughput of the processor. The switch instruction unit divides a unit time of processing into a reserved band for guaranteeing real-timeness and a non-reserved band not for guaranteeing real-timeness, and skips a task to be executed in the non-reserved band as appropriate when the processor falls in throughput.

This device may further comprise an interpretation unit which interprets a requirement pertaining to real-timeness written in programs executed by the respective tasks. In this case, the switch instruction unit may allocate each of the tasks to either the reserved band or the non-reserved band based on the interpretation. For example, the "requirement pertaining to real-timeness" may be information available to determine whether or not to execute the tasks in the reserved band. It may also be information indicating attributes written in the programs or information showing the significances or priorities of the tasks.

This device may further comprise a determination unit by which the processor determines properties of the programs executed by the respective tasks. In this case, the switch instruction unit may allocate each of the tasks to either the reserved band or the non-reserved band based on the determination. The "property of a program" may be an instruction called from the program, the rate or time of occupation of the processor by the program, or a characteristic obtained indirectly by executing the task.

Another embodiment of the present invention is a task management system. This system comprises: a processor which executes tasks at a predetermined operating frequency; a clock generation unit which supplies a clock having the operating frequency to the processor; and a switch instruction unit which issues an instruction to switch a plurality of tasks to be executed by the processor. The switch instruction unit divides a unit time of processing into a reserved band for guaranteeing real-timeness and a non-reserved band not for guaranteeing real-timeness, and skips a task to be executed in the non-reserved band as appropriate when the operating frequency of the processor falls.

Incidentally, any combinations of the foregoing components, and any conversions of expressions of the present invention from/into methods, apparatuses, systems, computer programs, and the like are also intended to constitute applicable aspects of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a diagram showing an example of a data structure of the task table in FIG. 4;

FIG. 17 is a chart or graphical representation of data retained in the control target table optimized by the update unit of FIG. 16.

DETAILED DESCRIPTION OF THE INVENTION

The invention will now be described by reference to the preferred embodiments. This does not intend to limit the scope of the present invention, but to exemplify the invention.

Before discussing embodiments, a clearer description will be given of the object. Take a game, for example, in which CG rendering and other drawing processes are designed to complete within a frame period. Hereinafter, tasks that must complete their processing within a predetermined period of time as above will be referred to as "real-time tasks." Tasks that have no time limit as if real-time tasks do will hereinafter be referred to as "non-real-time tasks." When these two types of tasks having different design concepts regarding the time are executed in parallel, the real-timeness of the real-time tasks depends greatly on the processing time of the non-real-time tasks.

Figure 1:
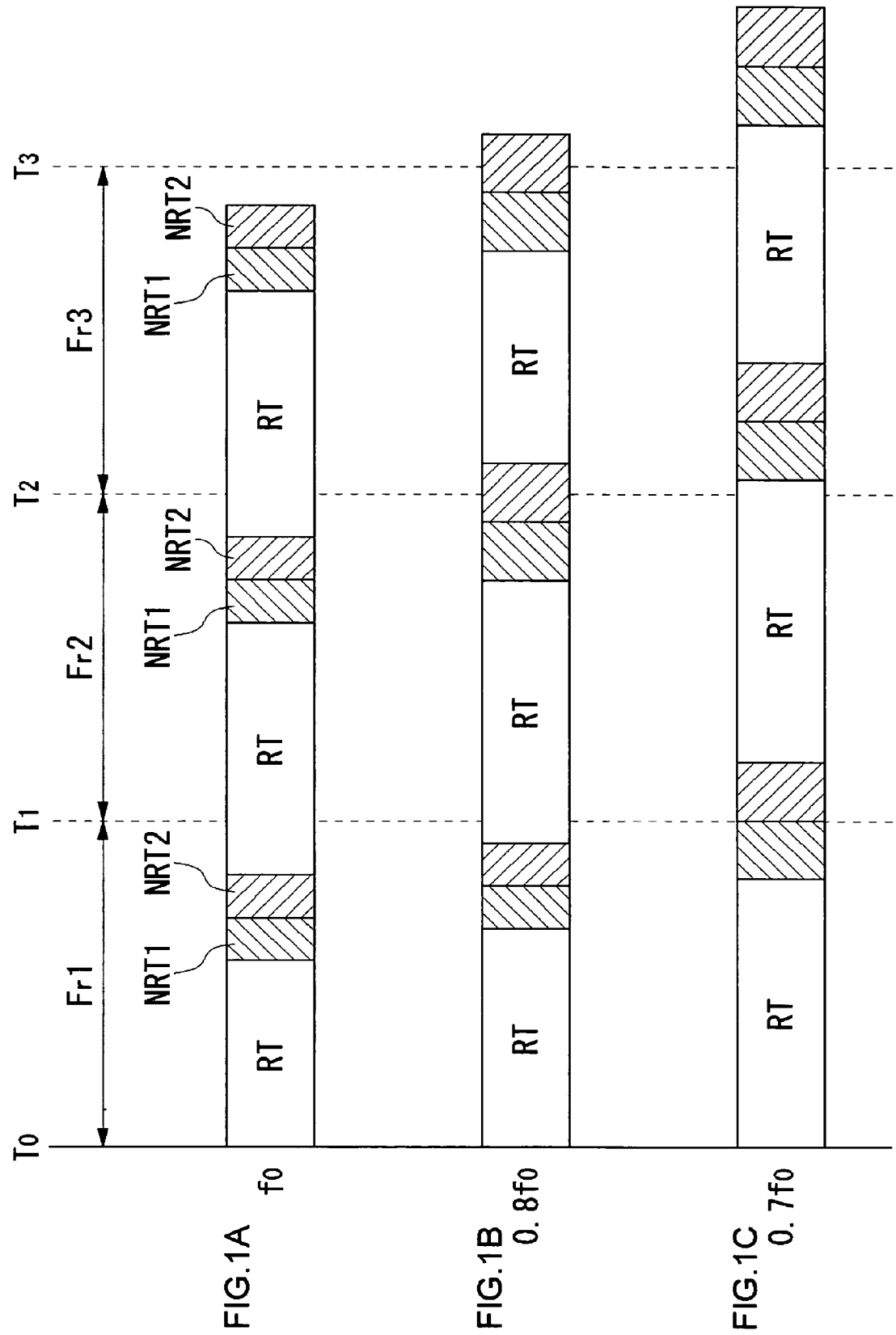
FIG. 1A is a diagram showing in a time-series fashion the state of processing of tasks by a processor which operates at a normal operating frequency.
FIG. 1B is a diagram showing in a time-series fashion the state of processing of tasks by the processor at a lower operating frequency.
FIG. 1C is a diagram showing in a time-series fashion the state of processing of tasks by the processor at an even lower operating frequency.

FIG. 1A is a diagram showing in a time-series fashion the state of processing of tasks by a processor which operates at a normal operating frequency of $f_0$. The periods from time T0 to time T1, from time T1 to time T2, and from time T2 to time T3 correspond to a single frame period each. In the diagram, a real-time task RT for drawing a frame and two non-real-time tasks NRT are executed by turns. Frames shall be displayed at times T1, T2, and T3. Between time T0 and T1, a real-time task RT, a first non-real-time task NRT1, and a second non-real-time task NRT2 are executed in succession. Subsequently, the real-time task RT for drawing a frame to be displayed at time T2 is executed, followed by the first non-real-time task NRT1 and the second non-real-time task NRT2 successively. Since the real-time tasks RT for displaying frames at times T1, T2, and T3 complete their processing before respective times T1, T2, and T3, the frames are displayed without dropping.

FIG. 1B is a diagram showing in a time-series fashion the state of processing of tasks by the processor at an operating frequency of 0.8 $f_0$. For example, the operating frequency of the processor is adjusted to exercise heat control on the processor. The higher the processor temperature is, the lower the operating frequency is adjusted to be. When the operating frequency is lowered, the number of execute cycles of the processor in a frame period decreases. This requires a longer time to complete each of the tasks. It follows that the real-time task RT, the first non-real-time task NRT1, and the second non-real-time task NRT2 to be executed in each frame period are executed in the subsequent frame period beyond the originally-intended frame period. In the diagram, the real-timeness of the real-time tasks RT is maintained substantially, whereas dropping frames can occur in the long run.

FIG. 1C is a diagram showing in a time-series fashion the state of processing of tasks by the processor at an operating frequency of 0.7 $f_0$. In the diagram, dropping frames occur immediately, failing to achieve game functions. As described above, when tasks are executed with a lower operating frequency in the same manner as with the normal operating frequency, it becomes difficult to guarantee the real-timeness of the real-time tasks.

Conventionally, computers have typically been used to run more or less a word processor program, an e-mail program, and the like in parallel, requiring not much attention to real-timeness of the tasks. In the meantime, game consoles even having general-purpose functions start to prevail, and the need for throttle technologies for lowering the operating frequency of a processor arises because of processor-heat problems. The inventor has thus reached the understanding of the foregoing problem of dropping frames in CG images, which has not been in the past.

Embodiment 1

Embodiments 1 and 2 will deal with a non-preemptive task management, or a task management method for situations where tasks are switched autonomously. The task management method according to embodiment 1 includes dividing a unit time of processing into a reserved band for guaranteeing real-timeness and a non-reserved band not for guaranteeing real-timeness, and skipping tasks to be executed in the non-reserved band as appropriate when processor throughput falls. That is, when the operating frequency of the processor is lowered to suppress heat generation, the real-timeness of tasks to be executed in the reserved band is guaranteed at the expense of processing the tasks to be executed in the non-reserved band in a best-efforts fashion.

The "reserved band" is the number of execute cycles of the processor to be guaranteed in unit time, and has a fixed value. The "non-reserved band" is the number of execute cycles of the processor not guaranteed in unit time, and has a variable value in a predetermined range of 0 to a given value. At the maximum processor throughput, the number of execute cycles is the sum of the number of execute cycles in the reserved band and the maximum number of execute cycles in the non-reserved band. For example, when the operating frequency of the processor is lowered for the sake of heat control, it is lowered so that variations in the number of execute cycles fall within the range of numbers of execute cycles available in the non-reserved band. Conversely, controlling the operating frequency within this range guarantees the real-timeness of the tasks to be executed in the reserved band.

In the task management method according to embodiment 1, a mixture of real-time tasks and non-real-time tasks are executed with the real-time tasks assigned to the reserved band and the non-real-time tasks the non-reserved band. For heat control, the operating frequency of the processor is controlled so that variations in the number of execute cycles due to the control of the operating frequency fall within the non-reserved band. Consequently, the control on the operating frequency for the sake of heat control on the processor can be performed independent of the program design. That is, it is possible to exercise flexible heat control without limiting the degree of freedom of the program design. This makes it possible to make full use of the processor throughput while changing the operating frequency for efficient heat control.

Figure 2:
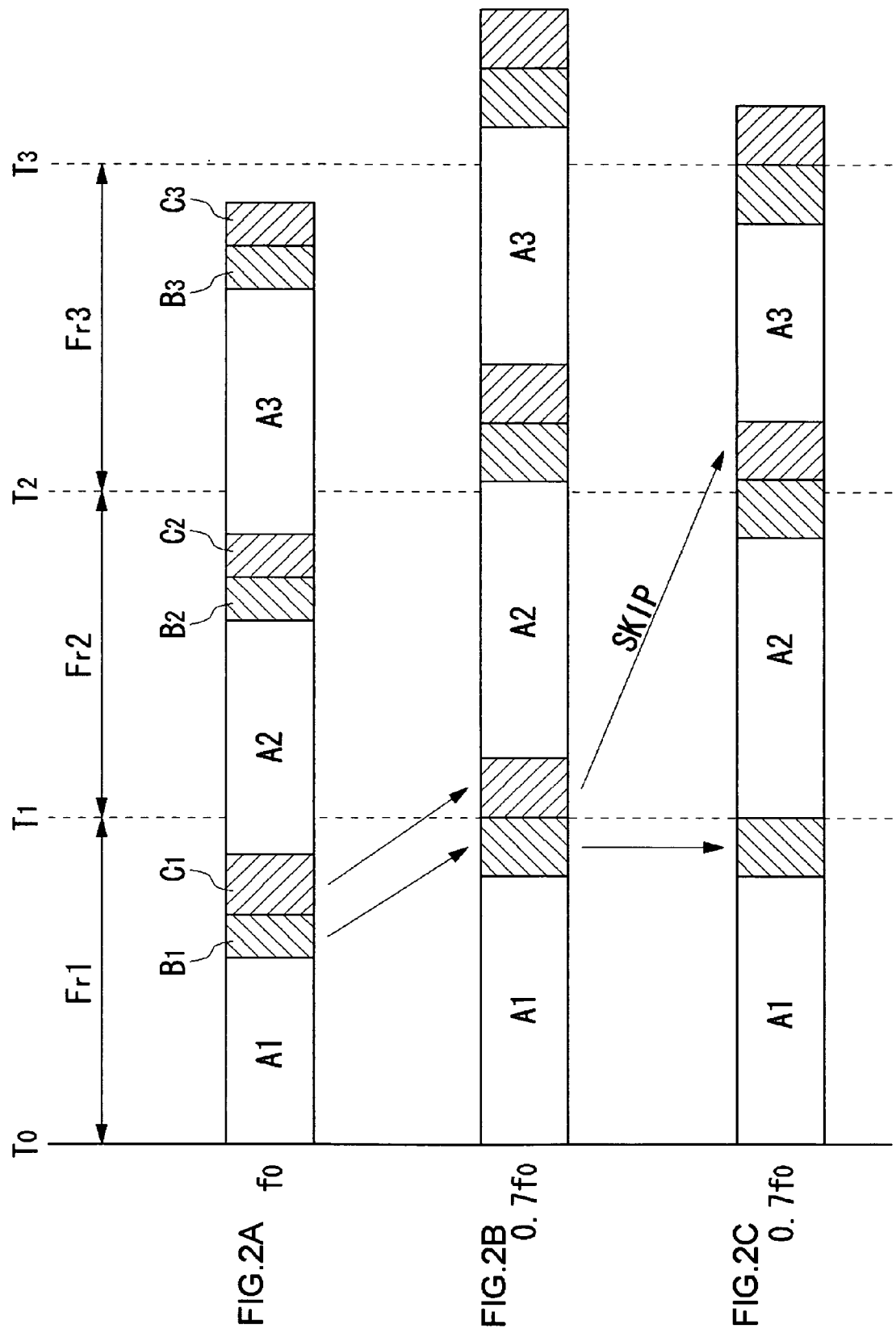
FIG. 2A is a diagram showing the state of execution of tasks at an operating frequency of $f_0$, i.e., at the normal operating frequency where the heat generation of the processor need not be suppressed.
FIG. 2B is a diagram showing the state of execution of tasks at an operating frequency of 0.7 $f_0$.
FIG. 2C is a diagram showing the state of execution of tasks at the operating frequency of 0.7 $f_0$ where the tasks are managed based on the task management method according to the present embodiment.

FIG. 2A is a diagram showing the state of execution of tasks at an operating frequency of $f_0$, i.e., at the normal operating frequency where the heat generation of the processor need not be suppressed. With the operating frequency of $f_0$, three tasks A, B, and C are executed in each single frame period. The task A is a real-time task to be assigned to the reserved band. The tasks B and C are non-real-time tasks to be assigned to the non-reserved band.

FIG. 2B is a diagram showing the state of execution of tasks at an operating frequency of 0.7 $f_0$. The real-time tasks A2 and A3 complete their processing after times T2 and T3. This means a dropping frame.

FIG. 2C is a diagram showing the state of execution of tasks at the operating frequency of 0.7 $f_0$ where the tasks are managed based on the task management method according to the present embodiment. In the diagram, the non-real-time task C1 is skipped. Skipping non-real-time tasks as above advances the timing to execute subsequent real-time tasks. It is therefore possible to guarantee the real-timeness of the real-time tasks. More specifically, in the present embodiment, the reserved band is set at 0.7 $f_0$ and the non-reserved band at 0. The control of task management is thus switched across 0.7 $f_0$.

Figure 3:
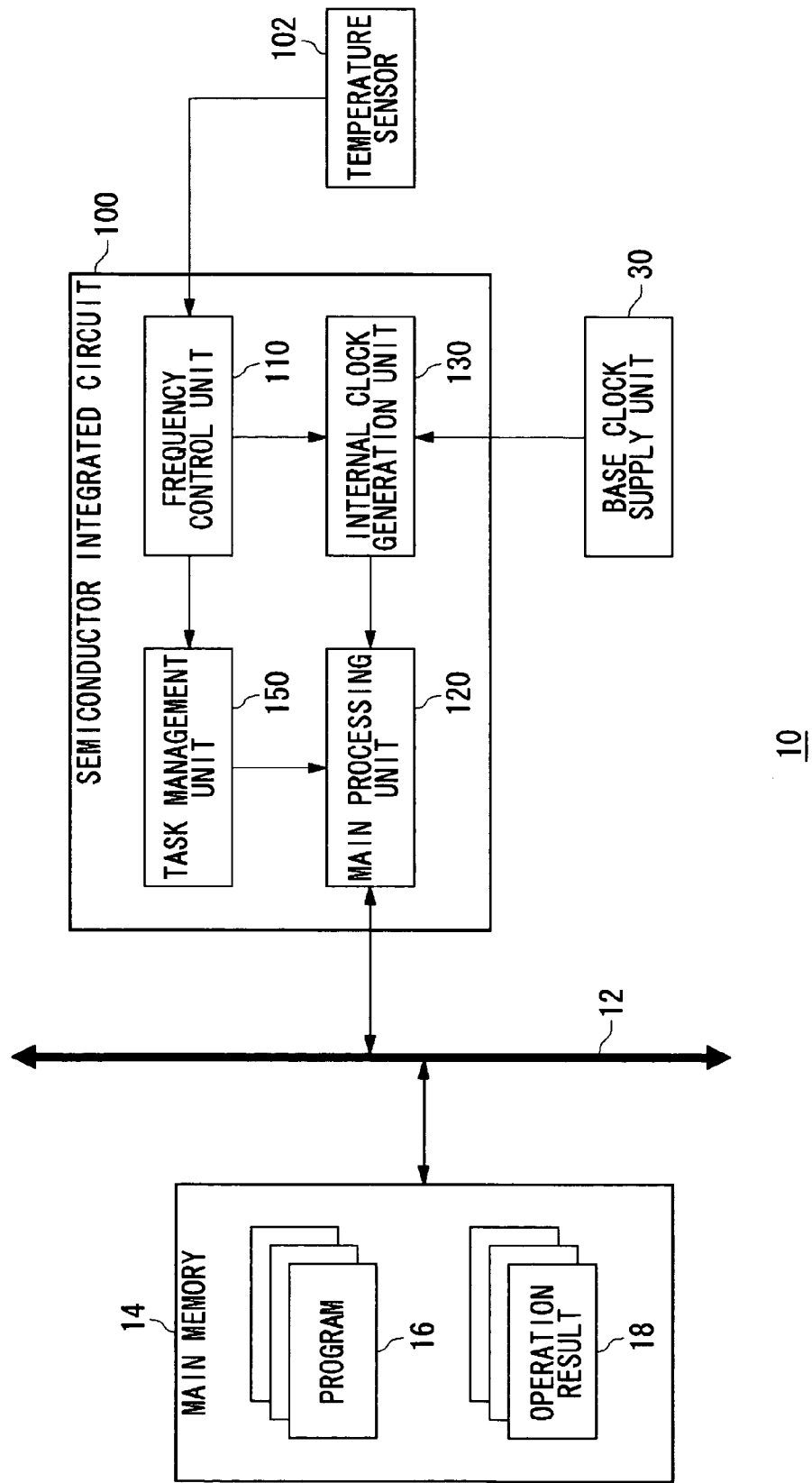
FIG. 3 is a block diagram of a processor system which executes tasks by using the task management method described with reference to FIGS. 2A to 2C.

FIG. 3 is a block diagram of a processor system 10 which executes tasks by using the task management method described with reference to FIG. 2C. This processor system 10 is mounted on a game console. The processor system 10 includes a processor or semiconductor integrated circuit 100 and a main memory 14, which are connected to a bus 12. The bus 12 includes an address bus, a data bus, and a control bus. The semiconductor integrated circuit 100 has a main processing unit 120, an internal clock generation unit 130, a task management unit 150, and a frequency control unit 110. The main memory 14 stores programs 16 to be executed by the semiconductor integrated circuit 100, and operation results 18 obtained through the execution of the respective programs 16. The programs 16 are read into the semiconductor integrated circuit 100 for task execution.

The semiconductor integrated circuit 100 includes not-shown circuits such as a cache memory, an instruction register, an arithmetic register, a decoder, a control unit, and an arithmetic unit, for example. Tasks are executed by using those circuits. Instructions stored in the cache memory or the main memory 14 are fetched and taken into the instruction register. The decoder decodes the instructions retained in the instruction register, and supplies control signals corresponding to the operation codes to the control unit. Based on the control signals, for example, the control unit selects arithmetic units for performing the processing corresponding to the operation codes, acquires data necessary for the operations from addresses designated by the operands, and writes the data to the operation register. The arithmetic units perform arithmetic processing by utilizing the data retained in the operation register, for example, and write to the addresses designated by the operands.

Note that FIG. 3 and subsequent diagrams show configuration in units of function blocks, not in units of hardware components. The functional blocks need not be statically formed in the semiconductor integrated circuit 100 at the same time, but may be formed dynamically for a certain period of time. For example, in the present embodiment, the task management unit 150 and the frequency control unit 110 shall be dynamically formed in the semiconductor integrated circuit 100 by executing programs built in an operating system. The main processing unit 120 may originally be considered as the entire semiconductor integrated circuit 100 itself. For ease of understanding, however, the main processing unit 120 here shall refer to the functional parts excluding the frequency control unit 110, the internal clock generation unit 130, and the task management unit 150.

A base clock supply unit 30 supplies a base clock to the semiconductor integrated circuit 100. The internal clock generation unit 130 includes a PLL (Phase Locked Loop), for example, and generates a clock having a frequency several times that of the base clock. The clock generated by the internal clock generation unit 130 will be referred to as operating clock, and the frequency of the operating clock as operating frequency. The individual circuits included in the semiconductor integrated circuit 100 operate with the rising or falling timing of the operating clock. The internal clock generation unit 130 can change the operating frequency by adjusting the counter value of a counter included in the circuits that constitute the PLL.

A temperature sensor 102 measures the temperature of the main processing unit 120 or a peripheral circuit thereof, and outputs the measured temperature to the frequency control unit 110. The temperature sensor 102 may be formed outside the semiconductor integrated circuit 100, or inside the semiconductor integrated circuit 100, i.e., on the die.

The frequency control unit 110 determines an operating frequency necessary for heat control in accordance with the temperature of the semiconductor integrated circuit 100. The frequency control unit 110 then controls the internal clock generation unit 130 to generate the operating clock having that frequency. When the temperature exceeds a predetermined threshold, the frequency control unit 110 controls the internal clock generation unit 130 to lower the operating frequency. Lowering the operating frequency can suppress the amount of heat generated by the semiconductor integrated circuit 100. This can decrease the temperature of the semiconductor integrated circuit 100 when combined with the action of heat radiation mechanisms such as a heat sink.

For heat control, the operating frequency is preferably adjusted so as not to sink below the reserved band. The operating frequency may be adjusted stepwise in accordance with the temperature of the semiconductor integrated circuit 100. The frequency control unit 100 may lower the operating frequency below the reserved band, however, if there are not much tasks to execute or if an emergency is expected where the amount of heat generated by the semiconductor integrated circuit 100 is so large that the temperature cannot be lowered sufficiently within the non-reserved band alone. As above, various methods are available to control the operating frequency depending on the amount of heat generation. The frequency control unit 110 may determine the operating frequency based on any method.

For example, the frequency control unit 110 determines the operating frequency by referring to a table that contains temperatures and operating frequencies of the semiconductor integrated circuit 100 in association with each other. Then, the frequency control unit 110 makes the internal clock generation unit 130 generate the operating clock having that operating frequency.

The main processing unit 120 reads programs 16 corresponding to tasks designated by the task management unit 150 from the main memory 14, and executes the tasks. The main processing unit 120 then writes operation results 18 obtained by executing the tasks to the main memory 14.

The task management unit 150 accepts frequency information for specifying the operating frequency of the main processing unit 120 from the frequency control unit 110, and schedules tasks based on the information and in accordance with the task management method mentioned above.

Figure 4:
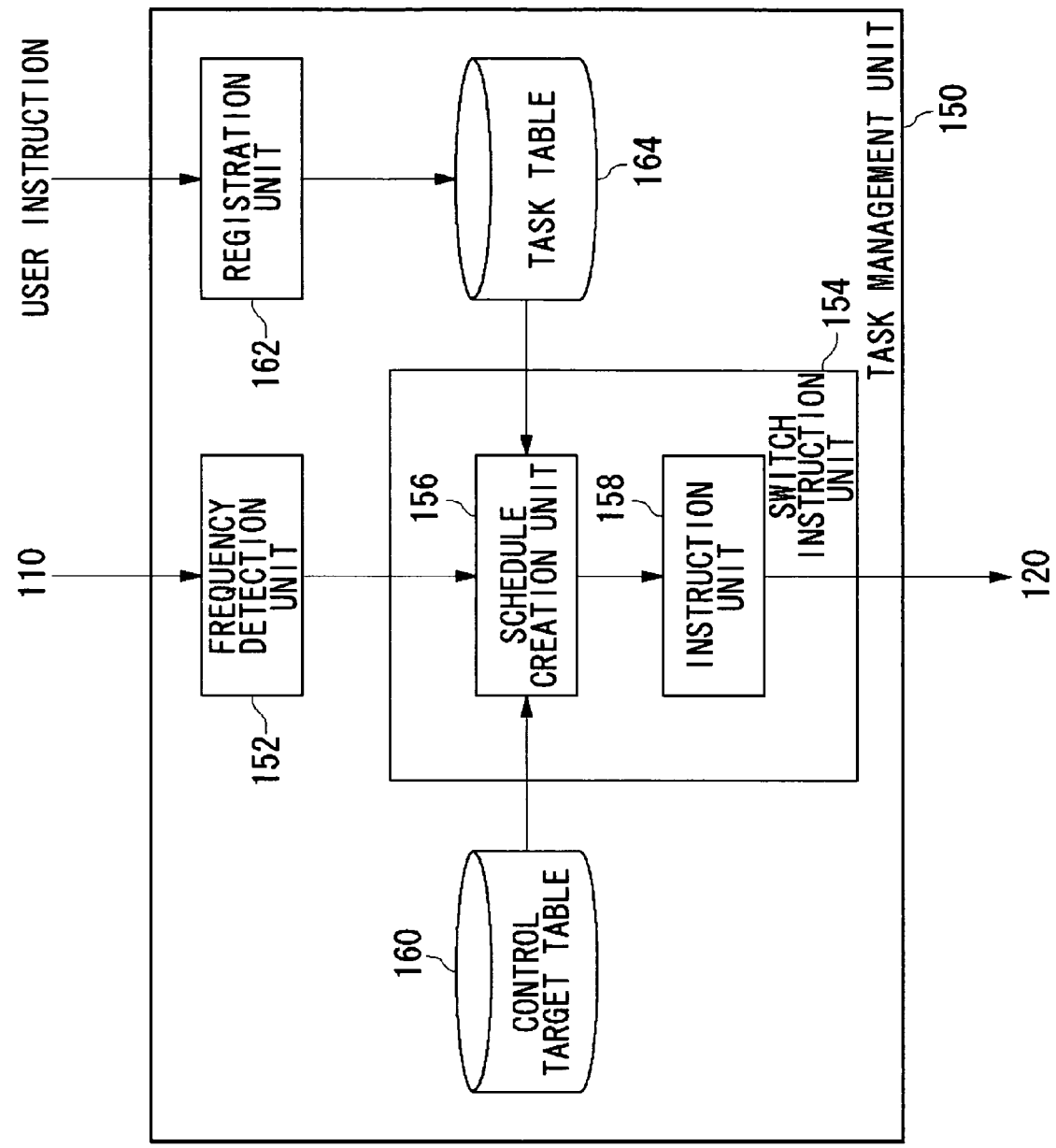
FIG. 4 is an internal block diagram of the task management unit of FIG. 3.

FIG. 4 is an internal block diagram of the task management unit 150 of FIG. 3. A frequency detection unit 152 detects the operating frequency. In the present embodiment, the frequency detection unit 152 grasps the operating frequency by accepting the frequency information from the frequency control unit 110. The frequency detection unit 152 outputs the frequency information to a switch instruction unit 154.

The switch instruction unit 154 has a schedule creation unit 156 and an instruction unit 158, and issues instructions to switch tasks for the main processing unit 120 to execute. As will be detailed later, the schedule creation unit 156 consults a control target table 160 and a task table 164 to schedule tasks according to the operating frequency. Based on the schedule created by the schedule creation unit 156, the instruction unit 158 gives the main processing unit 120 instructions to execute the respective tasks.

Figure 5:
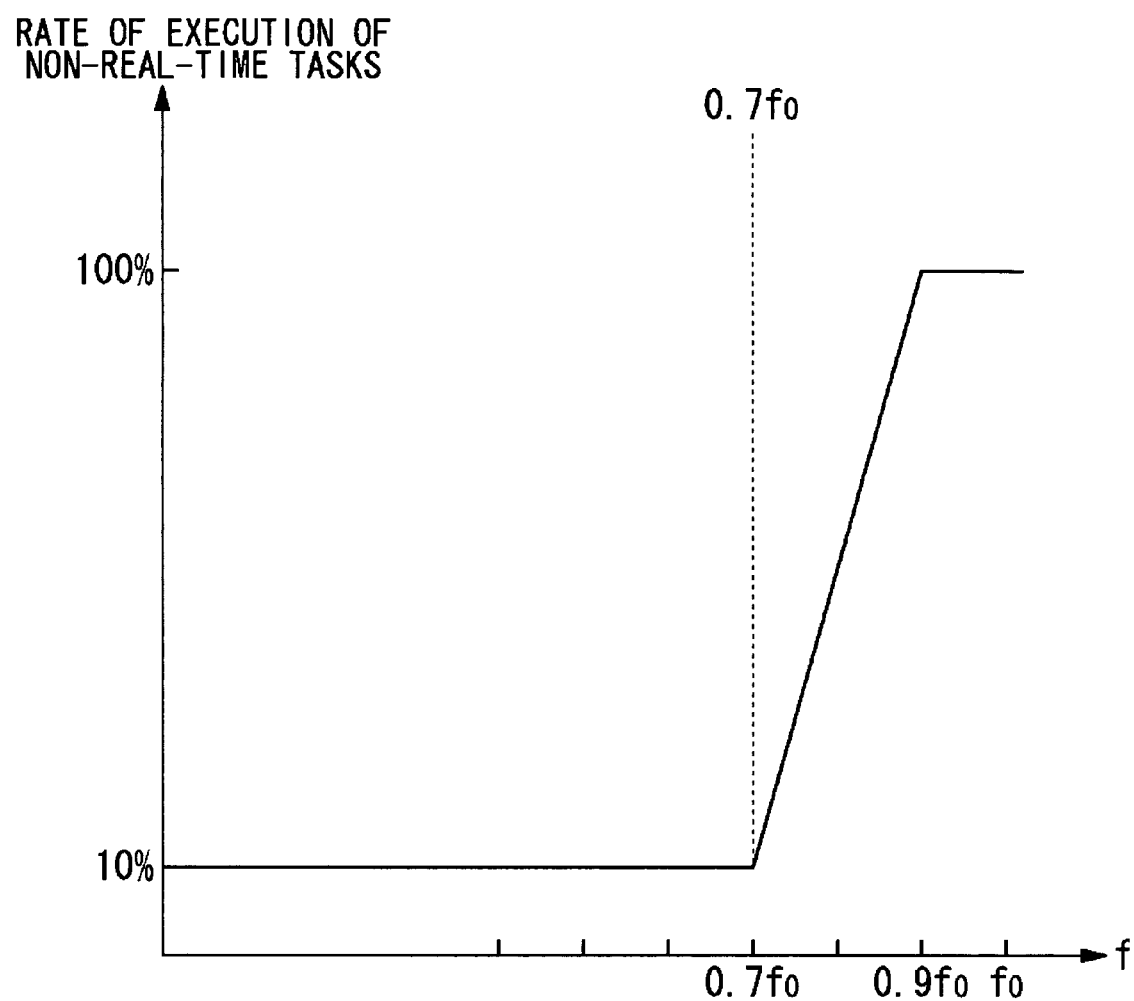
FIG. 5 is a chart or graphical representation of data retained in the control target table of FIG. 3.

FIG. 5 is a chart or graphical representation of data retained in the control target table 160 of FIG. 3. The control target table 160 holds the operating frequency and a control target, which determines how far to execute non-real-time tasks, in association with each other. This control target shows the ratio of the number of non-real-time tasks executed to the number of real-time tasks executed. Hereinafter, this ratio will be referred to as "the rate of execution." When plotted on a graph with the operating frequency on the abscissa and the rate of execution of non-real-time tasks on the ordinate, these pieces of data retained in the control target table 160 show different aspects across 0.7 $f_0$ as shown in this chart. In the present embodiment, the reserved band is set at 0.7 $f_0$. In the non-reserved band, or from $f_0$ to 0.9 $f_0$, non-real-time tasks have a rate of execution of 100%. From 0.9 $f_0$ to 0.7 $f_0$, the rate of execution of non-real-time tasks decreases linearly from 100% to 10%. When the operating frequency falls below 0.7 $f_0$, or the reserved band, the rate of execution of non-real-time tasks is set at 10%. Below 0.7 $f_0$, the rate of execution of non-real-time tasks may be set at 0% in order to guarantee the real-timeness of the real-time tasks. Nevertheless, the present embodiment employs the rate of execution of 10% so as to avoid such situations that non-real-time tasks are not executed at all. For example, a rate of execution of "30%" means that non-real-time tasks are executed three times while real-time tasks ten times. Based on this control target, the schedule creation unit 156 of FIG. 3 adjusts the timing of execution of non-real-time tasks.

FIG. 6 is a diagram showing an example of the data structure of the task table 164 in FIG. 4. The task table 164 has an attribute field 184, a task field 186, and a priority field 188 in association with each other. The attribute field 184 holds attribute information for indicating the attributes of tasks. In the present embodiment, the attributes are a real-time task and a non-real-time task. In the diagram, "RT" represents a real-time task and "NRT" a non-real-time task. The task field 186 retains information for identifying tasks, such as the filename of a program and identification information on a task. For example, in the diagram, a "rendering" task is registered as a real-time task. A "browser" task is registered as a non-real-time task. The priority field 188 retains information for indicating the priorities of the tasks. In the diagram, the priorities are shown on a scale of 1 to 10, where "10" is the highest in priority and "1" the lowest in priority.

Returning to FIG. 4, when a user gives an instruction to execute a program, for example, a registration unit 162 interprets attribute information included in the program code. The registration unit 162 then registers the attribute information in the task table 164 in association with information for identifying the program. If the program code does not contain any attribute information, the registration unit 162 registers the program in the task table 164 as a real-time task. This makes it possible to execute old programs which contain no attribute information, for example.

In another example, the registration unit 162 may determine the properties of programs to be executed for respective tasks, estimate the attributes of the programs based on the determination, and register them in the task table 164. Here, the registration unit 162 estimates the attributes of the programs based on characteristics obtained indirectly through the execution of the tasks, such as instructions included in the programs and the rates and times of occupation of the processor by the programs. For example, in the case of non-preemptive task management, the registration unit 162 may measure the time of occupation of the processor in a certain period task by task, and estimate tasks of longer occupation times to be real-time tasks and ones of shorter occupation times to be non-real-time tasks. This makes it possible to perform appropriate task management even on programs that have no attribute information in their program codes.

Figure 7:
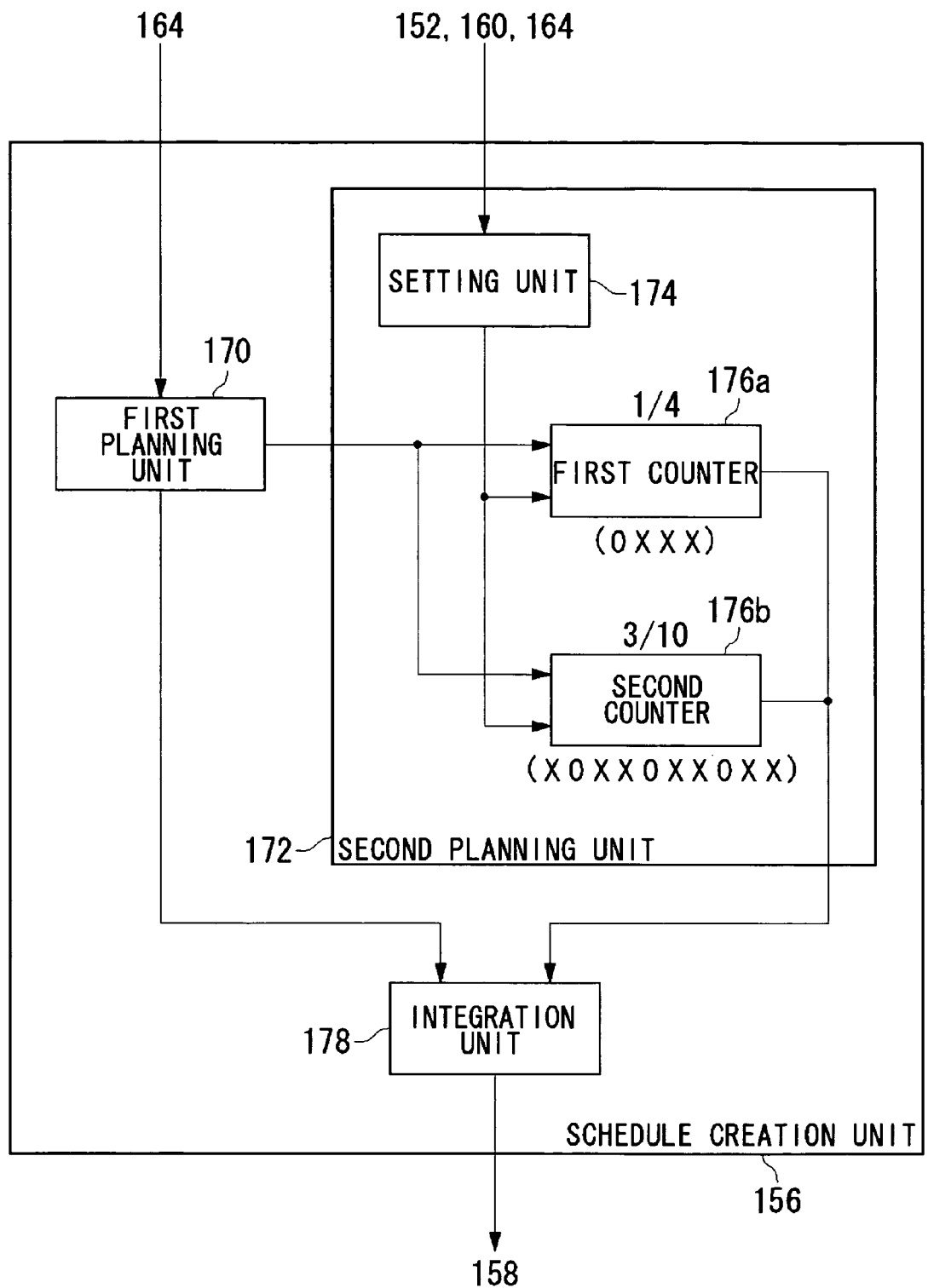
FIG. 7 is an internal block diagram of the schedule creation unit of FIG. 4.

FIG. 7 is an internal block diagram of the schedule creation unit 156 of FIG. 4. A first planning unit 170 consults the task table 164 and determines the order of execution of real-time tasks. When there are a plurality of real-time tasks, the first planning unit 170 refers to the priority field 188 of FIG. 6 and determines the order of execution so that real-time tasks having higher priorities come first. Then, the first planning unit 170 outputs the order of execution of real-time tasks to an integration unit 178.

A second planning unit 172 consults the task table 164, determines the order of execution of non-real-time tasks, and outputs the order of execution to the integration unit 178. The second planning unit 172 has a setting unit 174, a first counter 176a, and a second counter 176b. The first counter 176a and the second counter 176b will be referred to collectively as counters 176. The counters 176 count up each time the processing for scheduling non-real-time tasks is performed, and give permission to execute non-real-time tasks at set rates.

For example, the first counter 176a is a counter for permitting the execution of non-real-time tasks at a rate of 25%. That is, permission to execute a non-real-time task is given once while real-time tasks are executed three times. The permission timing may be determined arbitrarily. The diagram shows the case where the first counter 176a has the permission timing of "oxxx". Since "o" indicates permission and "x" no permission, the timing shows that the first counter 176a initially permits the execution of a non-real-time task before skipping three times.

The setting unit 174 accepts the current operating frequency from the frequency detection unit 152, and reads the control target for non-real-time tasks corresponding to the operating frequency from the control target table 160. Then, the setting unit 174 sets the rate at which the counter 176 permit the execution of non-real-time tasks according to the control target. For example, to execute 25% of non-real-time tasks, the setting unit 174 sets the counter 176 so as to permit the execution of non-real-time tasks every four times.

When there are a plurality of non-real-time tasks, counters 176 are provided as many as the non-real-time tasks. The setting unit 174 then sets the counters 176 so that the total number of execution of the plurality of non-real-time tasks coincides with the control target. Suppose, for example, that there are two non-real-time tasks, and the non-real-time tasks are executed at a rate of 25%. In this case, the setting unit 174 sets each of the first counter 176a and the second counter 176b to permit the execution of a non-real-time task once while real-time tasks are executed eight times. Moreover, the setting unit 174 sets the permission timing so that the two non-real-time tasks are executed at different timing. For example, the first counter 176a is given the permission timing of "xoxxxxxx" and the second counter 176b the permission timing of "xxxxxxox".

Moreover, when non-real-time tasks are executed at a rate of 50%, for example, the setting unit 174 sets such permission timing as "oxox" with discrete "o"s and "x"s, not "ooxx". That is, the permission timing is set so that non-real-time tasks are permitted to be executed at distributed timing. Distributing the timing to permit the execution of non-real-time tasks as above gives the non-real-time tasks a smoother feel.

The integration unit 178 creates a schedule by arranging the order of execution of real-time tasks supplied from the first planning unit 170 and the order of execution of non-real-time tasks supplied from the second planning unit 172 so that the order of execution of real-time tasks comes first. The integration unit 178 then outputs the created schedule to the instruction unit 158.

Figure 8:
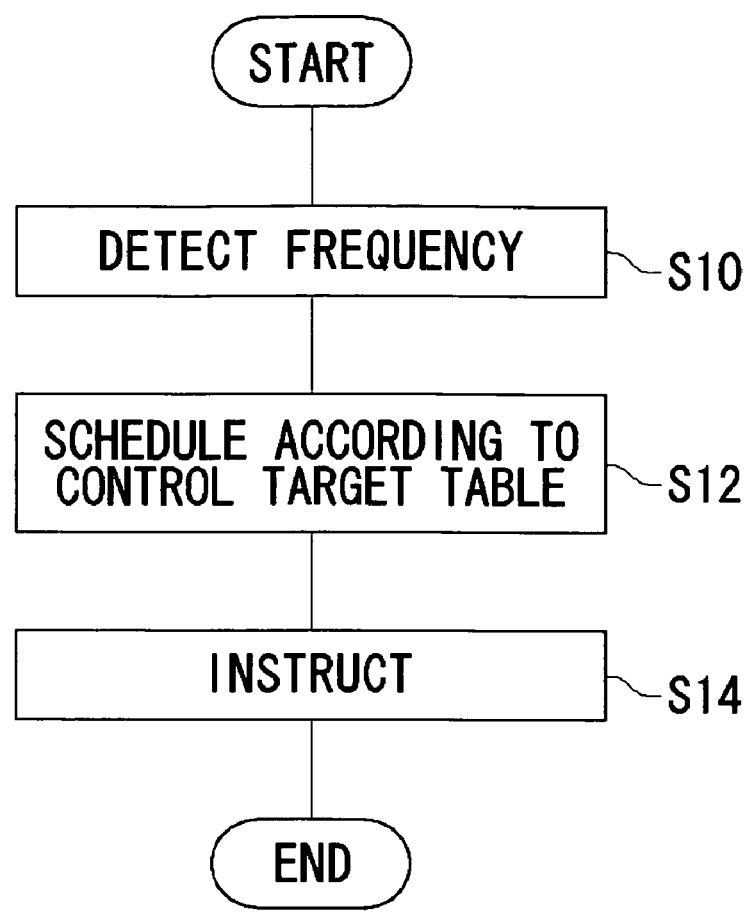
FIG. 8 is a flowchart of the processing for task management in the task management unit of FIG. 4.

FIG. 8 is a flowchart of the processing by which the task management unit 150 of FIG. 4 schedules tasks. The frequency detection unit 152 of FIG. 4 detects the operating frequency (S10). The schedule creation unit 156 of FIG. 4 consults the control target table 160 of FIG. 4 based on the operating frequency, and schedules the order of execution of real-time tasks and non-real-time tasks (S12). The instruction unit 158 of FIG. 4 issues instructions to execute tasks in the order scheduled by the schedule creation unit 156 (S14).

Embodiment 2

Figure 9:
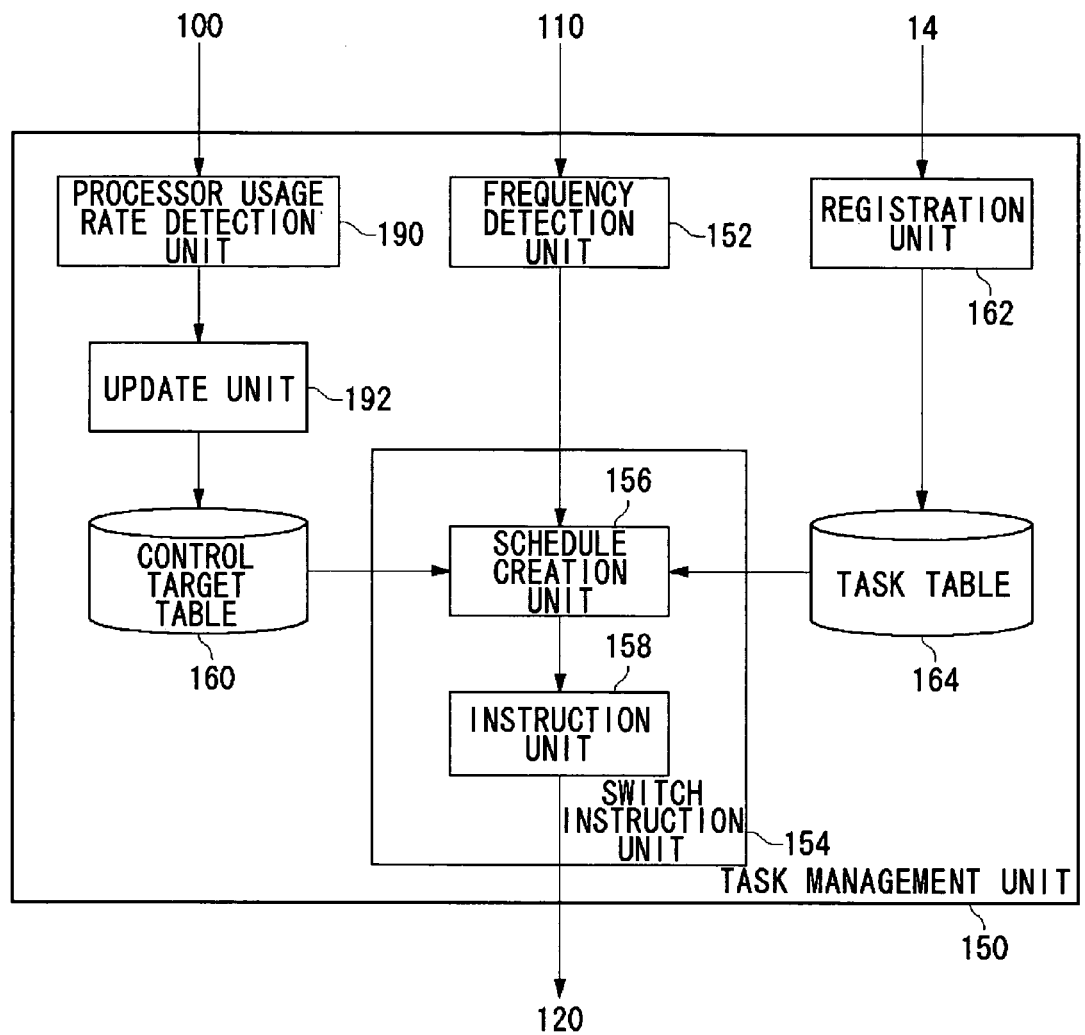
FIG. 9 is an internal block diagram of the task management unit according to embodiment 2.

FIG. 9 is an internal block diagram of the task management unit 150 according to embodiment 2. Embodiment 2 is one in which the control target table 160 is optimized according to the usage rate of the semiconductor integrated circuit 100. In the diagram, components having generally the same functions and operations as those of components described previously will be designated by identical reference numerals to those of the components described previously. The following description will deal chiefly with differences from the functions of the components described previously.

A processor usage rate detection unit 190 detects the usage rate of the semiconductor integrated circuit 100 of FIG. 3, for example, in every frame period. The processor usage rate detection unit 190 then outputs the usage rate to an update unit 192. The update unit 192 calculates an average usage rate over a predetermined period. Based on the average, the update unit 192 optimizes the control target table 160 so as to increase the rate of execution of non-real-time tasks. For example, the update unit 192 calculates an average usage rate over 0.5 seconds, i.e., 30 frames. If the average is lower than a threshold, or equivalently, if the load is relatively low, the update unit 192 increases the rate of execution of non-real-time tasks in the control target table 160. If the average is higher than the threshold, the update unit 192 restores the control target table to its default. The threshold and the range of increase in the rate of execution of non-real-time tasks may be set appropriately by experiments, or adjusted gradually through execution.

Figure 10:
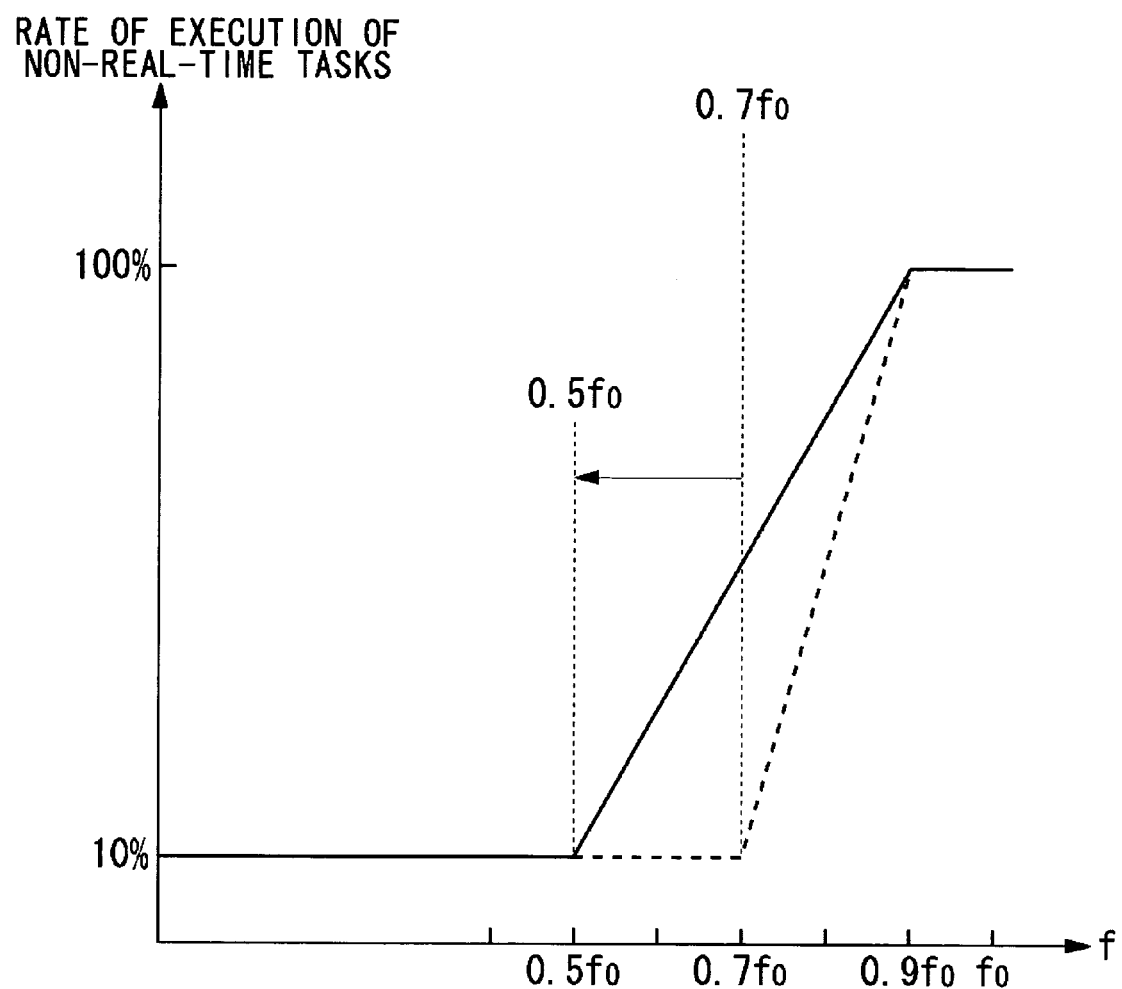
FIG. 10 is a chart or graphical representation of data retained in the control target table optimized by the update unit of FIG. 9.

FIG. 10 is a chart or graphical representation of data retained in the control target table 160, optimized by the update unit 192 of FIG. 9. In this chart, the reserved band is shifted to 0.5 $f_0$. From 0.9 $f_0$ to 0.5 $f_0$, the rate of execution of non-real-time tasks is decreased linearly from 100% to 10%. When the reserved band is thus adjusted according to the usage rate of the processor, it is possible to make effective use of the processor throughput.

Figure 11:
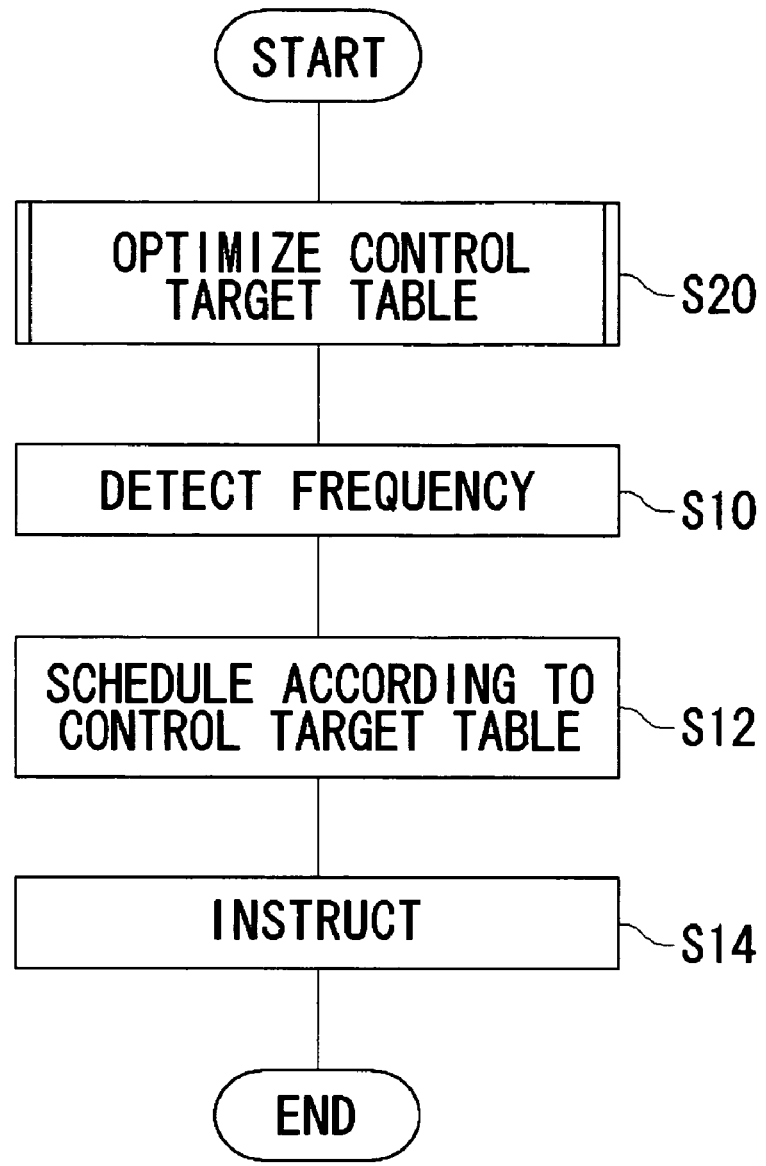
FIG. 11 is a flowchart of the task management processing in the task management unit of FIG. 9.

FIG. 11 is a flowchart of the processing by which the task management unit 150 of FIG. 9 schedules tasks. The scheduling processing in the task management unit 150 of FIG. 9 is achieved by adding the processing for optimizing the control target table (S20) to the scheduling processing of the task management unit 150 of FIG. 4 which has been described with reference to FIG. 8.

Figure 12:
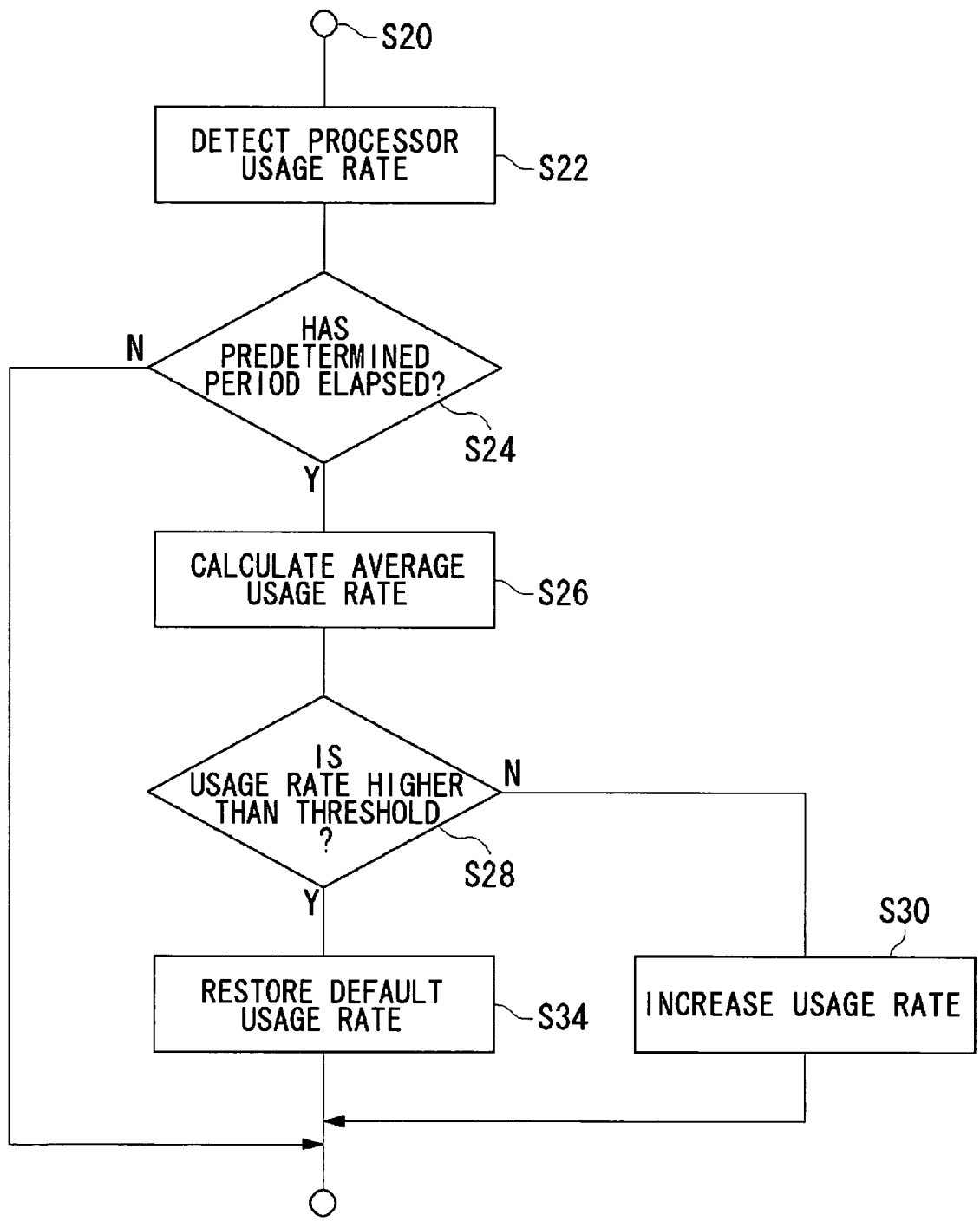
FIG. 12 is a detailed flowchart of the processing for updating the control target table of FIG. 9.

FIG. 12 is a detailed flowchart of the processing for optimizing the target control table of FIG. 11 (S20). The processor usage rate detection unit 190 of FIG. 9 detects the usage rate of the semiconductor integrated circuit 100 of FIG. 3 (S22). The update unit 192 of FIG. 9 determines whether or not a predetermined period has elapsed (S24). If the predetermined period has elapsed (Y at S24), the update unit 192 calculates the average usage rate in that period (S26). Then, if the usage rate is higher than a predetermined threshold (Y at S28), the control target table is restored to its default (S34). At step 28, if the usage rate is lower than the predetermined threshold (N at S28), the update unit 192 modifies the control target table so as to increase the rate of execution of non-real-time tasks (S30). At step 24, if the predetermined period has not elapsed yet (N at S24), the processing moves to step 10 of FIG. 11. As above, since the control target table 160 is optimized according to the usage rate of the main processing unit 120, it is possible to maximize the throughput of the main processing unit 120.

Embodiment 3

Embodiments 3 and 4 will deal with a preemptive task management, or a task management method for situations where tasks are forcibly switched by timer interruptions. Hereinafter, a frame period will be denoted as "t". In the task management method according to embodiment 3, non-real-time tasks are executed in a period that is allocated as a non-reserved band. Hereinafter, a period that is allocated as a reserved band will be referred to as "reserved period tr," and a period that is allocated as a non-reserved band will be referred to as "non-reserved period tn." If there are a plurality of non-real-time tasks, the non-reserved period tn is divided into equal parts in which the respective non-real-time tasks are executed.

Figure 13:
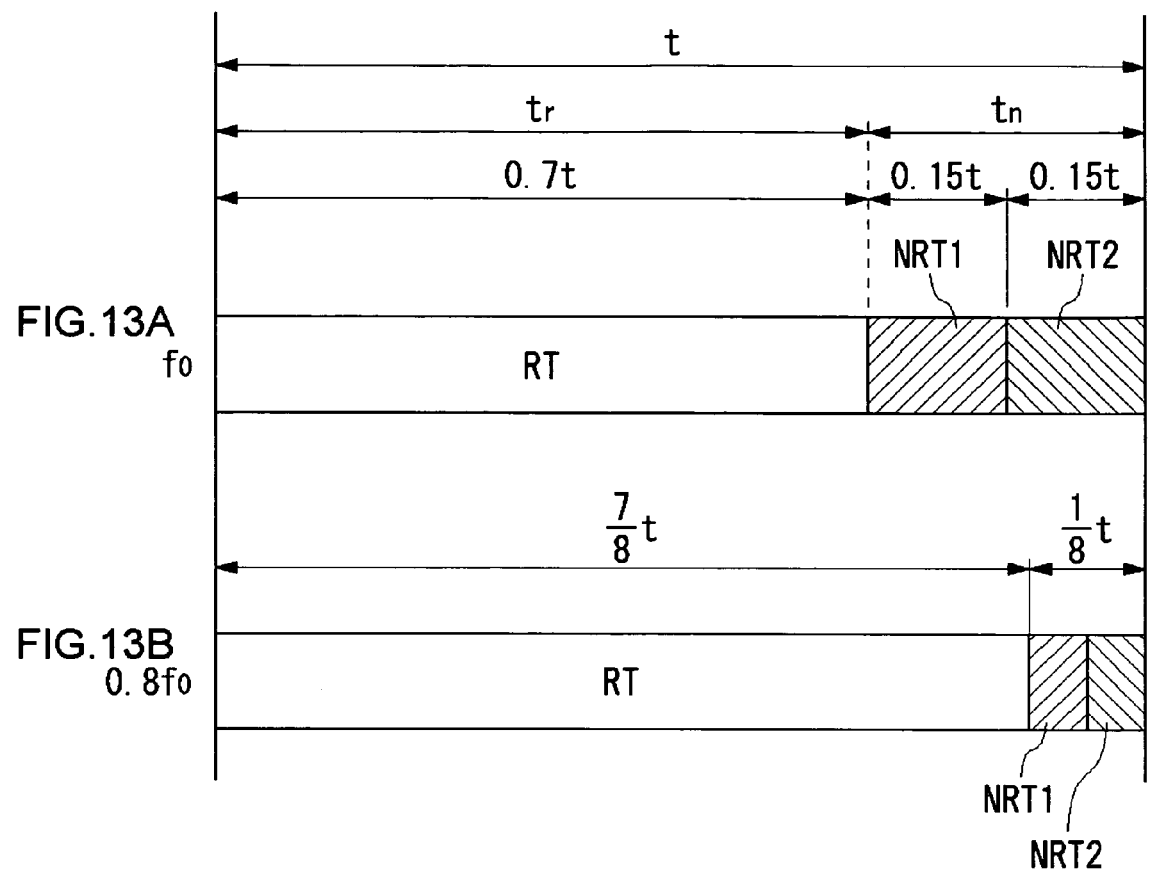
FIG. 13A is a diagram showing the state of execution of tasks at an operating frequency of $f_0$.
FIG. 13B is a diagram showing the state of execution of tasks at an operating frequency of 0.8 $f_0$.

FIG. 13A is a diagram showing the state of execution of tasks at an operating frequency of $f_0$. When the operating frequency is $f_0$, the reserved period tr is set at 0.7 t and the non-reserved period tn 0.3 t. Since there are two non-real-time tasks, the non-real-time tasks are executed in succession over a period of 0.15 t each.

FIG. 13B is a diagram showing the state of execution of tasks at an operating frequency of 0.8 $f_0$. When the operating frequency is 0.8 $f_0$, the period equivalent to the operating frequency is $t/(0.8 \cdot f_0)$. The reserved period tr is thus 0.7 $f_0 \cdot t/(0.8 \cdot f_0) = 7/8 \cdot t$, and the non-reserved period tn is $1/8 \cdot t$. Since there are two non-real-time tasks, the non-real-time tasks are executed in succession over a period of $1/16 \cdot t$ each. In the diagram, the reserved period tr is occupied by the real-time task RT. Nevertheless, since the program of the real-time task RT is designed to complete processing within a period shorter than the reserved period tr, it is typically rare for the reserved period tr to be fully occupied.

Figure 14:
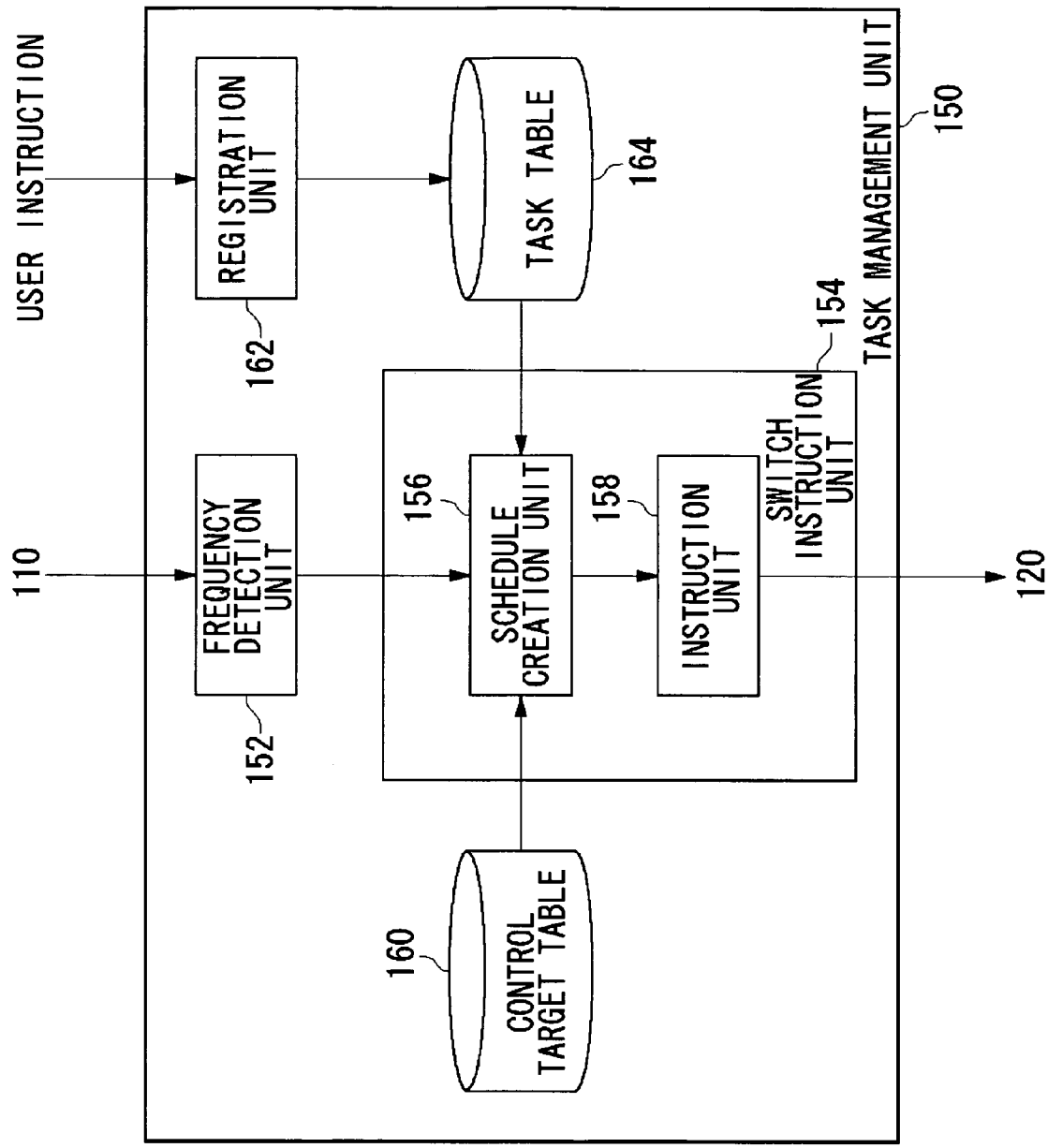
FIG. 14 is a diagram showing an example of the internal block diagram of the task management unit according to embodiment 3.

FIG. 14 is a diagram showing an example of the internal block diagram of the task management unit 150 according to embodiment 3. In the diagram, components having generally the same functions and operations as those of components described previously will be designated by identical reference numerals to those of the components described previously. The following description will deal chiefly with differences from the functions of the components described previously. The schedule creation unit 156 schedules tasks in the manner as described with reference to FIG. 13. The schedule creation unit 156 reads real-time tasks and non-real-time tasks from the task table 164, and creates a schedule so that the real-time tasks are executed before the non-real-time tasks. For the sake of scheduling, the schedule creation unit 156 also consults the control target table 160 to determine the execution times of the non-real-time tasks corresponding to the operating frequency. Then, the schedule creation unit 156 creates the schedule, for example, so that the non-real-time tasks are associated with their respective execution times. Based on the execution times included in the schedule, the instruction unit 158 sets an interrupt timer for switching the non-real-time tasks.

Figure 15:
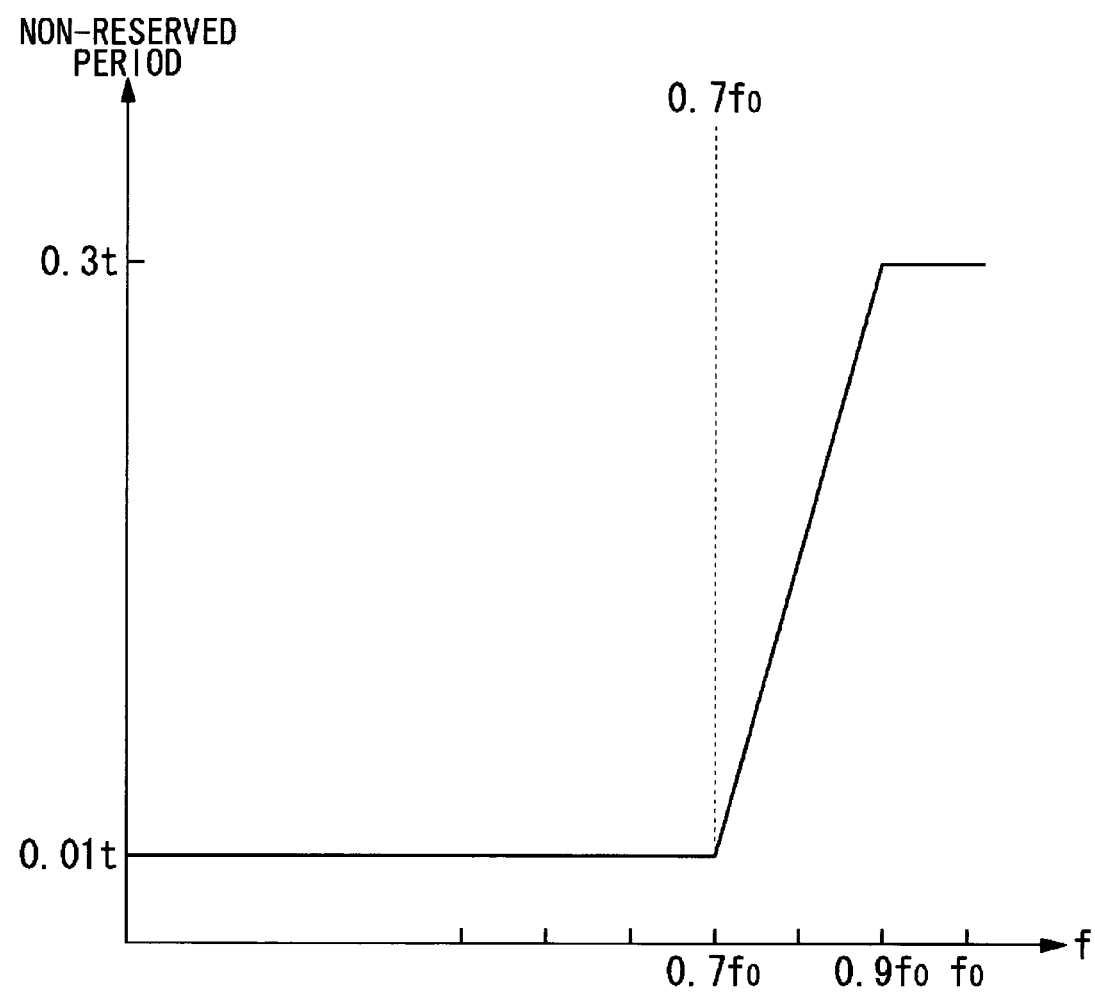
FIG. 15 is a chart or graphical representation of data retained in the control target table of FIG. 14.

FIG. 15 is a chart or graphical representation of data retained in the control target table 160 of FIG. 14. The control target table 160 retains the operating frequency and the time for which the processor can be occupied to execute non-real-time tasks, i.e., the non-reserved period tn in association with each other. When plotted on a graph with the operating frequency on the abscissa and the non-reserved period tn on the ordinate, these pieces of data retained in the control target table 160 show different aspects across 0.7 $f_0$ as shown in this chart. In the present embodiment, the reserved band is set at 0.7 $f_0$. In the non-reserved band, or from $f_0$ to 0.9 $f_0$, the non-reserved period tn is 0.3 t. From 0.9 $f_0$ to 0.7 $f_0$, the non-reserved period tn decreases linearly from 0.3 t to 0.01 t. When the operating frequency falls below the reserved band of 0.7 $f_0$, the non-reserved period tn is set at 0.01 t. Below 0.7 $f_0$, the non-reserved period tn may be set at 0 in order to guarantee the real-timeness of the real-time tasks. Nevertheless, the present embodiment employs a non-reserved period tn of 0.01 t so as to avoid such situations that non-real-time tasks are not executed at all. For example, if the non-reserved period tn is "0.1 t" and there are two non-real-time tasks, each of the non-real-time tasks has an execution time of 0.05 t. Based on this control target, the schedule creation unit 156 of FIG. 14 adjusts the execution time of the non-real-time tasks.

Embodiment 4

Figure 16:
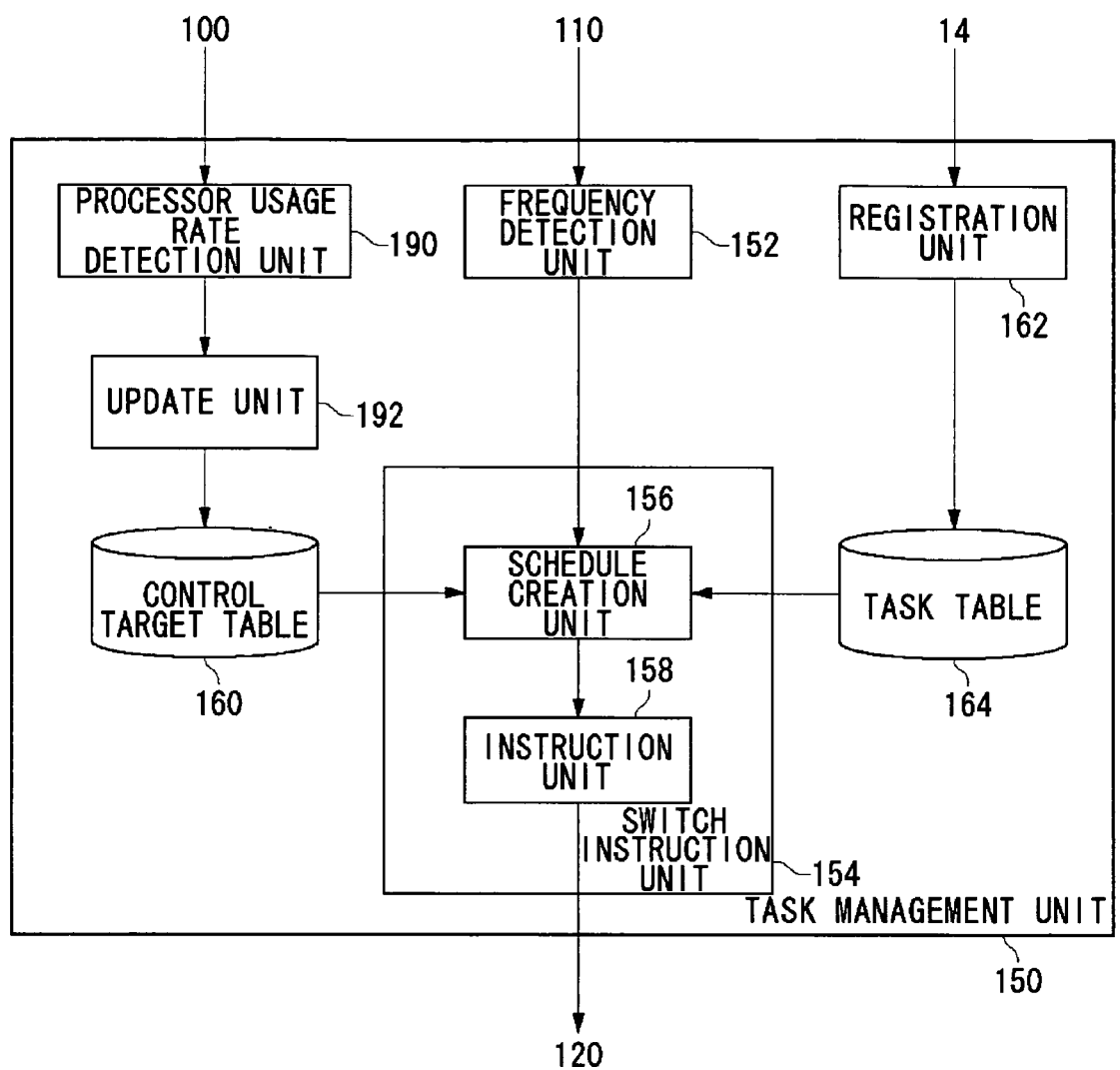
FIG. 16 is an internal block diagram of the task management unit according to embodiment 4.

FIG. 16 is an internal block diagram of the task management unit 150 according to embodiment 4. Embodiment 4 is one in which the control target table 160 is optimized according to the usage rate of the semiconductor integrated circuit 100. In the diagram, components having generally the same functions and operations as those of components described previously will be designated by identical reference numerals to those of the components described previously. The following description will deal chiefly with differences from the functions of the components described previously.

The update unit 192 calculates an average usage rate of the semiconductor integrated circuit 100 in a predetermined period. Based on the average, the update unit 192 optimizes the control target table 160 so as to increase the non-reserved period tn. If the average is lower than a threshold, or equivalently, if the load is relatively low, the update unit 192 increases the non-reserved period tn of the control target table 160. If the average is higher than the threshold, the update unit 192 restores the control target table to its default. The threshold to be used for the update determination and the range of increase of the non-reserved period tn may be set as appropriate by experiments, or adjusted gradually through execution.

FIG. 17 is a chart or graphical representation of data retained in the control target table 160, optimized by the update unit 192 of FIG. 16. In this chart, the reserved band is shifted to 0.5 $f_0$. From 0.9 $f_0$ to 0.5 $f_0$, the non-reserved period tn decreases linearly from 0.3 t to 0.01 t. When the reserved band is thus adjusted according to the usage rate of the processor, it is possible to make effective use of the processor throughput.

Up to this point, the present invention has been described in conjunction with the embodiments thereof. These embodiments have been given solely by way of illustration. It will be understood by those skilled in the art that various modifications may be made to combinations of the foregoing components and processes, and all such modifications are also intended to fall within the scope of the present invention. Embodiments 1 to 4 have dealt with the cases where tasks having such time limits that their drawing processing must be completed within a single frame period are allocated to the reserved band, and tasks having no time limit are allocated to the non-reserved band. In a modification, however, the condition for allocation between the reserved period and the non-reserved period is not necessarily limited thereto.

Tasks may be allocated to the reserved band or the non-reserved band depending on aspects other than time limits. For example, tasks may be allocated to either of the reserved band and the non-reserved band depending on whether the data must be recorded with reliability or not. For instance, if there are a task for recording a broadcast program and a task of a word processor, the recording task may be allocated to the reserved band and the word-processor task for the non-reserved band in view of reliable data recording. As above, the condition for allocation between the reserved band and the non-reserved band can be changed to adopt the task management methods described in the embodiments, for example, into electronic apparatuses having a real-time OS installed therein, such as an aircraft control computer and an automobile control computer.

The embodiments have dealt with the cases where the operating frequency of the semiconductor integrated circuit 100 is controlled in view of heat control. In another modification, the operating frequency may be controlled in view of power consumption. The power consumption is proportional to the operating frequency of the clock, the number of transistors in the circuits, and the square of the power supply voltage. Conversely, if the operating frequency, the number of load transistors, and the power supply voltage are known, it is possible to calculate the power consumption. For example, the frequency control unit 110 of FIG. 3 may acquire a voltage value from a sensor for measuring the output voltage of a regulator. The operating frequency is then lowered to avoid thermal runaway when the power consumption calculated from the voltage value exceeds a predetermined threshold. Moreover, if it is judged whether the power supply is in battery mode or AC supply mode, and found to be in the battery mode, the operating frequency may be lowered for the sake of power saving. Even in these cases, the task management methods described in the embodiments can be used to guarantee real-time tasks' real-timeness.

The embodiments have dealt with the cases where the rate of execution of non-real-time tasks is adjusted in accordance with the operating frequency of the main processing unit 120. In another modification, the rate of execution of non-real-time tasks may be adjusted in accordance with the temperature of the main processing unit 120 or a peripheral circuit thereof. Suppose, for example, that there is a circuit for controlling the operating frequency of the clock to be supplied to the main processing unit 120 according to the temperature of the main processing unit 120 or a peripheral circuit thereof independently of software. Then, the operating frequency is controlled in accordance with the temperature of the main processing unit 120 or the peripheral circuit by hardware means. When such a circuit cannot acquire by software means the frequency information but the temperature information, i.e., when the task management unit 150 of FIG. 3 cannot acquire the frequency information but the temperature information, the rate of execution of tasks may be adjusted based on the temperature information. In this case, the control target table 160 of FIG. 4 retains, for example, the temperature of the main processing unit 120 or the peripheral circuit thereof and the rate of execution in association with each other. Based on this table, the schedule creation unit 156 of FIG. 4 then adjusts the timing to execute non-real-time tasks.

The rate of execution of non-real-time tasks may also be adjusted in accordance with the power consumption of the main processing unit 120 or the semiconductor integrated circuit 100. When the task management unit 150 of FIG. 3 cannot acquire the frequency information but power consumption information from various types of power management programs or the like, the rate of execution of tasks may be adjusted based on the power consumption information. In this case, the control target table 160 of FIG. 4 retains, for example, the power consumption information and the rate of execution in association with each other. Based on this table, the schedule creation unit 156 of FIG. 4 then adjusts the timing to execute non-real-time tasks.

The present invention is applicable to the field of task management of a processor.

What is claimed is:

1. A method of executing tasks comprising:
dividing a unit of processing time for executing tasks of a process by a processor into a reserved band for guaranteeing time-critical tasks and a non-reserved band for non-time-critical tasks; and
skipping a task to be executed in the non-reserved band when operating frequency of a processor falls, wherein
a non-time-critical task is determined to be skipped by consulting a control target table, wherein the control target table stores information on operating frequency of the processor and an associated rate of execution of a task to be executed in the non-reserved band at the operating frequency.

2. The method of executing tasks according to claim 1, wherein the operating frequency of the processor is lowered when the processor or a peripheral circuit thereof exceeds a predetermined threshold in temperature.

3. The method of executing tasks according to claim 1, wherein the operating frequency of the processor is lowered depending on power consumption of the processor.

4. A task management method comprising:
classifying tasks to be executed by a processor into a first type and a second type depending on properties thereof; and
executing tasks of the first type while skipping a task of the second type to be executed between the tasks of the first type when operating frequency of the processor falls, wherein
the second type of task is determined to be skipped by consulting a control target table, wherein the control target table stores information on operating frequency of the processor and an associated rate of execution of the second type of task to be executed at the operating frequency.

5. The task management method according to claim 4, wherein:
the processor recognizes, by a predetermined method, that a task of the first type is one that is time-critical; and
the processor recognizes, by a predetermined method, that a task of the second type is one that is non-time-critical.

6. A task management device comprising:
a local memory;
a switch instruction unit, which issues an instruction to switch a plurality of tasks to be executed by a main processing unit; and
a detection unit, which detects operating frequency of the main processing unit, wherein the switch instruction unit divides a unit of processing time of processing into a reserved band for guaranteeing time-critical tasks and a non-reserved band for non-time-critical tasks, and skips a task to be executed in the non-reserved band when the operating frequency of the main processing unit falls, wherein
a non-time-critical task is determined to be skipped by consulting a control target table stored in memory, wherein the control target table stores information on operating frequency of the main processing unit and an associated rate of execution of a task to be executed in the non-reserved band at the operating frequency.

7. The task management device according to claim 6, further comprising an interpretation unit, which interprets a time-critical requirement pertaining to programs executed by the respective tasks, and wherein
the switch instruction unit allocates each of the tasks to either the reserved band or the non-reserved band based on the interpretation.

8. The task management device according to claim 6, further comprising a determination unit that determines properties of programs executed by the respective tasks, and wherein the switch instruction unit allocates each of the tasks to either the reserved band or the non-reserved band based on the determination.

9. The task management device according to claims 6, wherein the unit of processing time is one pertaining to display processing.

10. A task management device comprising:
a local memory;
a switch instruction unit, which issues an instruction to switch a plurality of tasks to be executed by a main processing unit; and
a detection unit, which detects operating frequency of the main processing unit, wherein
the switch instruction unit classifies the tasks to be executed by the main processing unit into a first type and a second type depending on properties thereof, and executes tasks of the first type while skipping a task of the second type to be executed between the tasks of the first type when operating frequency of the main processing unit falls, wherein
the second type of task is determined to be skipped by consulting a control target table stored in memory, wherein the control target table stores information on operating frequency of the main processing unit and an associated rate of execution of the second type of task to be executed at the operating frequency.

11. A semiconductor integrated circuit comprising:
a main processing unit, which executes predetermined tasks; and
a task management unit, which divides a unit of processing time of processing into a reserved band for guaranteeing time-critical tasks and a non-reserved band for non-time-critical tasks, and skips a task to be executed in the non-reserved band when operating frequency of the main processing unit falls,
a non-time-critical task is determined to be skipped by consulting a control target table, wherein the control target table stores information on operating frequency of the main processing unit and an associated rate of execution of a task to be executed in the non-reserved band at the operating frequency.

12. The semiconductor integrated circuit according to claim 11, further comprising a clock generation unit, which supplies a clock having a predetermined operating frequency to the main processing unit.

13. The semiconductor integrated circuit according to claim 12, wherein the clock generation unit lowers the operating frequency when the main processing unit or a periphery thereof exceeds a predetermined threshold in temperature.

14. The semiconductor integrated circuit according to claim 13, wherein the clock generation unit lowers the operating frequency depending on power consumption.

15. The semiconductor integrated circuit according to claim 12, wherein the task management unit skips the task to be executed in the non-reserved band when the main processing unit or a periphery thereof exceeds a predetermined threshold in temperature.

16. The semiconductor integrated circuit according to claim 12, wherein the task management unit skips the task to be executed in the non-reserved band depending on power consumption.

17. A semiconductor integrated circuit comprising:
a main processing unit, which executes tasks at a predetermined operating frequency;
a clock generation unit, which supplies a clock having the operating frequency to the main processing unit;
a circuit, which receives a task management function for task management to divide a unit of processing time into a reserved band for guaranteeing time-critical tasks and a non-reserved band for non-time-critical tasks for skipping a task to be executed in the non-reserved band when the operating frequency of the main processing unit falls; and
a control target table, wherein a non-time-critical task is determined to be skipped by consulting the control target table, wherein the control target table stores information on operating frequency of the main processing unit and an associated rate of execution of a task to be executed in the non-reserved band at the operating frequency.

18. An electronic apparatus comprising:
a processor, which executes tasks at a predetermined operating frequency; and
a storing unit, which stores a program to be executed by said processor, wherein the processor executes the program to perform a function for task management to divide a unit of processing time into a reserved band for guaranteeing time-critical tasks and a non-reserved band for non-time-critical tasks for skipping a task to be executed in the non-reserved band when the operating frequency of the processor falls; and
a control target table, wherein a non-time-critical task is determined to be skipped by consulting the control target table, wherein the control target table stores information on operating frequency of the processor and an associated rate of execution of a task to be executed in the non-reserved band at the operating frequency.

19. The electronic apparatus according to claim 18, further comprising a frequency control unit which lowers the operating frequency when the processor or a peripheral circuit thereof exceeds a predetermined threshold in temperature.

20. The electronic apparatus according to claim 18, further comprising a frequency control unit which lowers the operating frequency depending on power consumption.

21. A computer-readable storage medium that stores a program executed by a processor, the program including a function of:
dividing a unit of processing time into a reserved band for guaranteeing time-critical tasks and a non-reserved band for non-time-critical tasks for skipping a task to be executed in the non-reserved band when operating frequency of the processor falls,
wherein a non-time-critical task is determined to be skipped by consulting a control target table, wherein the control target table stores information on operating frequency of the processor and an associated rate of execution of a task to be executed in the non-reserved band at the operating frequency.

22. A computer-readable storage medium that stores a program executed by a processor, the program including the functions of:
classifying tasks to be executed by the processor into a first type and a second type depending on properties thereof; and
executing tasks of the first type while skipping a task of the second type to be executed between the tasks of the first type when operating frequency of the processor falls, wherein
the second type of task is determined to be skipped by consulting a control target table, wherein the control target table stores information on operating frequency of the processor and an associated rate of execution of the second type of task to be executed at the operating frequency.

23. A task management system comprising:

a processor, which executes tasks at a predetermined operating frequency;

a clock generation unit, which supplies a clock having the operating frequency to said processor; and a switch instruction unit, which issues an instruction to switch a plurality of tasks to be executed by said processor, wherein the switch instruction unit divides a unit of processing time for executing tasks of a process by the processor into a reserved band for guaranteeing time-critical tasks and a non-reserved band for non-time-critical tasks and skips a task to be executed in the non-reserved band when the operating frequency of the processor falls, and wherein a non-time-critical task is determined to be skipped by consulting a control target table, wherein the control target table stores information on operating frequency of the processor and an associated rate of execution of a task to be executed in the non-reserved band at the operating frequency.

24. The task management system according to claim 23, wherein the clock generation unit lowers the operating frequency when the processor or a peripheral circuit thereof exceeds a predetermined threshold in temperature.

25. The task management system according to claim 23, wherein the clock generation unit lowers the operating frequency depending on power consumption.

* * * * *